United States Patent Office 3,325,333
Patented June 13, 1967

3,325,333
ADHESION OF POLYESTER MATERIALS TO A RUBBER COMPOUND
Koji Kigane, Yamaguchi-ken, Shinichi Yamada, Iwakuni-shi, Yamaguchi-ken, Yukinori Isozaki, Otake-shi, Hiroshima-ken, and Yasuhiko Yada, Iwakuni-shi, Yamaguchi-ken, Japan, assignors to Teijin Limited, Osaka, Japan, a corporation of Japan
No Drawing. Filed Sept. 10, 1963, Ser. No. 307,809
Claims priority, application Japan, Sept. 21, 1962, 37/41,515, 37/41,517
12 Claims. (Cl. 156—331)

This invention relates to improvements in the adhesion of polyester materials, particularly polyester textile materials, to a rubber compound. More particularly, the invention relates to the improved adhesion to rubber of polyester materials containing high molecular weight polyesters, such as filaments, yarns, cords, cord fabrics, films and the like.

The polyesters as used in this invention is meant to include any of the high molecular weight polyesters obtained from alpha-omega-glycols and dicarboxylic acids, particularly the high molecular weight polyesters obtained from polymethylene glycol and aromatic dicarboxylic acids. The most typical of these is polyethylene terephthalate, it being, of course, possible to use in like manner the polymer obtained by incorporating therein a third component.

A the rubber compound used in the invention, included are natural rubber and the polymers of isoprene such as synthetic 1,4-cis-polyisoprene; the polymers of butadiene such as 1,4-cis-polybutadiene, a butadiene/styrene copolymer, a butadiene/acrylonitrile copolymer, a butadiene/vinylpyridine copolymer, and a butadiene/styrene/vinylpyridine copolymer; the polymers of chloroprene and the rubberlike substances of similar nature.

Notwithstanding the fact that, on one hand, the polyester fibers possessed the most desirable properties as a material for reinforcing rubber, such as superior tensile strength, shock resistance, stretch resistance, dimensional stability, heat resistance, resistance to chemicals, water resisting property, resistance to microorganisms and weatherability, on the other, because of the fact that the molecules of polyesters were inactive, there was the drawback that an adhesive force necessary for putting them to service could not be obtained by the customary adhesion treatment procedures.

Namely, an adhesive such as, for example, the vinylpyridine copolymer latex-resorcinol-formaldehyde dispersion whose industrial value in adhering cellulosic fibers to rubber had been proven in the past does not yield satisfactory results in the adhesion of polyester fibers to rubber. As a consequence, many proposals have been made heretofore for adhering polyester textile materials to rubber.

For example, Walter L. Thompson discloses in U.S. Patent 2,994,671 the use as an adhesive composition of an aqueous dispersion containing latex and a blocked isocyanate such as bis-phenylurethane obtained by blocking 4,4' - diphenylmethanediisocyanate with phenol. This blocked isocyanate, however, is hardly water-dispersible. Hence, indispersing this in water the conjoint use of a water-soluble thickening agent such as a salt of alginic acid must be made. The dispersion is still not entirely stable even though a thickening agent is used. In addition, the use of a thickening agent results in a high viscous dispersion, which sticks to the parts of the processing machine and hence gives rise to troublesome operative problems.

Accordingly, an object of this invention is to provide a process for bonding a polyester material to rubber or the like. Another object is to provide a process for imparting an adhesion exhibiting a greatly improved adhesive property in bonding a polyester material to rubber or the like.

A further object of this invention is to provide, in reinforcing rubber articles, an improved process for bonding to rubber or the like a textile material obtained from the polyethylene terephthalate polymer.

A particular object of the present invention is to provide an adhesive composition suited for use in large scale bonding operations of polyester materials to rubber or the like, and also a process for the preparation thereof.

Other objects and advantage of this invention will be apparent from the following description.

The process of the present invention by which the foregoing objects are attained comprises treating said material with an aqueous adhesive composition containing a methylolated blocked organic polyisocyanate, a vulcanizable organic polymer and preferably a water-soluble resorcinol/formaldehyde condensate, said methylolated blocked organic polyisocyanate being prepared by blocking an organic polyisocyanate with a polyphenol selected from the group consisting of resorcinol, pyrocatechol, hydroquinone, pyrogallol, hydroxyhydroquinone and phloroglucinol and subsequently methylolating the resulting blocked polyisocyanate with formaldehyde, heating said material at a temperature of from 100 to 250° C., and thereafter bonding said material to said rubber compound.

This invention also provides an adhesive composition for use in the process, which comprises an aqueous dispersion containing from 1 to 20% by weight of the methylolated blocked organic polyisocyanate and from 1 to 20% by weight of the vulcanizable organic polymer. Preferably from 1 to 10% by weight of the water-soluble resorcinol/formaldehyde condensate may be present in the composition.

There is also provided a preferred process for preparing the adhesive composition. It comprises reacting a blocked organic polyisocyanate, preferably a mixture of the blocked organic polyisocyanate and resorcinol, with formaldehyde in a water-compatible organic solvent and thereafter admixing the reaction mixture, water and an aqueous dispersion of the vulcanizable organic polymer.

METHYLOLATED BLOCKED ORGANIC POLYISOCYANATE

The adhesive agent, i.e., the methylolated blocked organic polyisocyanate, is prepared by a process comprising first blocking an organic polyisocyanate with a polyphenol in an organic solvent not containing active hydrogen atoms followed by methylolating the resulting blocked isocyanate with formaldehyde in a water-compatible organic solvent.

The organic polyisocyanates capable of being used include tolyene-2,4 diisocyanate, tolyene-2,6 diisocyanate, phenylene-1,4 diisocyanate, phenylene-1,3 diisocyanate, diphenylmethane-4,4' diisocyanate, triphenylenemethane-4,4',4''-triisocyanate, naphthylene-1,5 diisocyanate and the like.

The polyphenols with which the isocyanates are blocked include resorcinol, pyrocatechol, hydroquinone, pyrogallol, hydroxyhydroquinone and phloroglucinol.

The ratio in which the polyphenol is used to the isocyanate is in equivalence or more. It is also possible to used phenol as a replacement of part of the polyphenol used in the reaction.

The organic solvent to be used as the medium of the blocking reaction may be any so long as it does not contain active hydrogen atoms, but it is preferred that it be one which will dissolve at least one of the reaction components. Examples of preferred solvents are acetone, benzene, toluene, dioxane, tetrahydrofuran, N,N-dimethylformamide, cyclohexanone and diethyl ether. Of these, those which are compatible with water are advantageously used. The reason therefor being that it is possible to submit the as-formed blocked isocyanate to the next following methylolation step without the necessity for the separation thereof.

The reaction can usually be carried out at a temperature of from 50 to 150° C. If a catalyst such as triethylamine is used, the reaction is completed in 3 to 4 hours. Upon dumping the reaction mixture in a large quantity of water, the blocked isocyanate precipitates.

The methylolation of the blocked isocyanate is preferably carried out in an organic solvent compatible with water. Preferred solvents include N,N-dimethylformamide, dioxane, acetone and tetrahydrofuran.

While the methylolation reaction of the blocked isocyanate can be carried out in the state in which it is dispersed in water, this procedure is not recommended, because a thickening agent must be used either during the methylolation reaction or in preparing the desired aqueous adhesive dispersion from the product obtained.

The methylolating agent, i.e., formaldehyde, can be used in the form of either formalin, paraformaldehyde, or a compound capable of liberating formaldehyde under reaction conditions. As a catalyst, preferred is an alkali such as hydroxide of an alkali metal.

When as the methylolating agent, i.e., formaldehyde, formalin is used, it may be merely added to the solution of the blocked isocyanate, to which then may be added an aqueous solution of a catalyst such as caustic soda. On the other hand, when paraformaldehyde is used, it is necessary to have resort to such means as first dissolving the paraformaldehyde either in a caustic soda aqueous solution or in an alcoholic solution of caustic soda and then adding this to the solution of the blocked isocyanate. While the reaction can be carried out at room temperature, it is also possible to conduct the reaction at somewhat lower temperatures or at elevated temperatures of about 60° C.

The methylolated blocked isocyanate need not be separated from the reaction mixture, as it is possible to use the reaction mixture in its as-obtained state in preparing the adhesive composition of this invention. This reaction mixture readily dissolves or emulsifies in water.

In preparing the methylolated blocked isocyanate of this invention it is critical that the blocking be carried out prior to the methylolation. It is not permissible to methylolate the polyphenol and then to block the resulting methylolated polyphenol. The reason for this is because first, the methylol groups of the methylolyated polyphenol would react with the isocyanate groups of the polyisocyanate so as to result in a product whose content of methylol groups is small and which is less soluble or dispersible and is relatively difficult of dissociating with heat; and secondly, the methylolated polyhenols contain a considerable amount of active hydrogen-containing compounds such as water, and these, by reacting with the isocyanate groups, would wastefully consume the polyisocyanate. The blocking of the polyisocyanate must be carried out in the substantial absence of water.

ADHESIVE COMPOSITION

The adhesive composition of this invention comprises an aqueous dispersion which contains the methylolated blocked organic polyisocyanate, a vulcanizable organic polymer, and preferably a water-soluble resorcinol/formaldehyde condensate.

A vulcanizable organic polymer means an organic polymeric material which contain residual unsaturation. Preferred examples of vulcanizable organic polymers are natural rubber, a butadiene/styrene copolymer, a butadiene/vinylpyridine copolymer, a butadiene/acrylonitrile copolymer, a butadiene/styrene/vinylpyridine copolymer, a polychloroprene and an isobutylene/isoprene copolymer. The vulcanizable organic polymers are commercially available in the form of a latex.

The preferred adhesive composition according to this invention comprises an aqueous dispersion which contains from 1 to 20% by weight of the methylolated blocked organic polyisocyanate, from 1 to 20% by weight of the vulcanizable organic polymer, and from 1 to 10% by weight of a water-soluble resorcinol/formaldehyde condensate.

This desirable adhesive composition can be conveniently prepared by a process in which in methylolating the blocked polyisocyanate in an organic solvent compatible with water resorcinol is caused to be present in the reaction medium thereby effecting the condensation of the resorcinol and formaldehyde concurrently with the methylolation of the blocked polyisocyanate, and thereafter mixing the reaction mixture with a latex, i.e. an aqueous dispersion of a vulcanizable organic polymer. This reaction mixture is readily soluble in water.

ADHESION PROCESSING

According to the process of this invention, a polyester material can be bonded to a rubber compound by treating the polyester material with the adhesive composition, heating the treated material to a temperature within the range of from 100 to 250° C., and then bonding the heated material to the rubber compound.

The treatment of the polyester material with the adhesive compound may be by any suitable method. While the adhesive composition may be sprayed or brushed on to the polyester material to be treated, it is generally preferred to dip the polyester material into the adhesive composition in its relaxed or tensioned state and to take it out therefrom at a suitably prescribed pickup of the composition.

The solid pickup of the film formed on the surface of the polyester material, according to this invention, increases rectilinearly with the increase in the concentration of the adhesive agents in the treatment liquor used. However, while the adhesive force between the polyester material and rubber increases to a certain extent proportionally with the amount of the foregoing resin adhering, subsequently the increase in the adhesive force slackens, and it is observed that a critical point exists. This fact teaches that if the coating is a minute and uniform resin film and covers the whole of the surface of polyester material to be adhered, it suffices even though it is very thin and that resin adhering in excess of this requirement is not productive of any results that would be favorable for increasing the adhesive force. A resin film coated with an excessive amount of the resin must be avoided as it is not only costly but also since there is even observed a tendency to a reduction in the resistance to the various fatigues that the product subsequent to its adhesion to rubber is bound to be subjected to.

In bonding polyester materials to rubber, the optimum amount of resin adhesion of the coating as would give the maximum adhesive force will generally vary with the utility of the intended product and the form of the polyester material to be used. There may be occasions in which maximum adhesive force is not necessarily required. Hence, in practicing the process of this invention, it is preferred that with a knowledge of the optimum amount of resin required of the coating in accordance with utility of the finished product and the form of the polyester material used the treatment be carried out so as to meet these requirements. Namely, a selection is made of the pickup of the adhesive composition so that the optimum amount of resin adhesion is obtained. A suitable solid pickup in the case of a tire cord is about 0.4–10% by weight, in the case of a cable cord, about 0.2–8% by weight, and in the case of a textile fabric or film, of the order of about 0.3–12% by weight.

The treated polyester material must then be heated to a temperature within the range 100–250° C. If this temperature is less than 100° C., the reaction of the adhesive agent and the formation of the film suffers while, on the other hand, at a temperature exceeding 250° C. there is a tendency to the polyester material being adversely affected.

In the preparation of tire cords, generally the practice is to heat treat the cords under tension with the object being to lessen the tendency of a cord to stretch when subjected to loads or to shrink during the step of vulcanizing the rubber. The heat treatment that is given according to this invention during the formation of the coating can conveniently serve also for the foregoing heat treatment operation of the cord itself. Further, particularly in the case the material to be treated is a polyethylene terephthalate fiber, by carrying out this heat treatment under a tension as will allow a contraction of the cord so that it also serves as the heat treatment to be given during the formation of the coating the performance of the tire is greatly enhanced.

The bonding of the coated polyester material to the rubber compound can be carried out concurrently with the vulcanization of the rubber.

To further illustrate the present invention, the following examples are given, it being understood that these are merely intended to be illustrative and not in limitation of the invention.

*Example 1*

33 grams of resorcinol was dissolved in 100 grams of dimethylformamide (DMF), which was then stirred for 6 hours at 40° C. while adding dropwise a solution consisting of 40 grams of diphenylmethane-4,4-diisocyanate dissolved in 100 grams of DMF. The resulting liquor was transparent.

While stirring a large quantity of water with a high speed stirrer, this solution was poured into obtain a white precipitate. The precipitate was filtered off and thoroughly washed with water. It was then dried for 24 hours under reduced pressure and ground in a mortar to obtain a powdery 4,4-diphenylmethane bis (3 hydroxydiphenylurethane). For brevity's sake, hereinafter this will be abbreviated to DMRU. The yield was 94.6%.

*Example 2*

A mixture consisting of 300 grams of a 20% methylene chloride solution of triphenylmethane-4,4',4''-triisocyanate and 53.3 grams of resorcinol to which had been added 0.6 gram of triethylamine as the catalysts was charged to a reactor, whose temperature was then raised to 40° C. and, while stirring, the methylene chloride was distilled off.

Concurrently with this 200 grams of dioxane was added dropwise from a dropping funnel in amounts matching the amounts distilled off of the methylene chloride. The distillation off of the methylene chloride was finished at about 60° C. and then a reflux condenser was connected and the reaction effected at 100° C. Six hours later, the reaction was stopped, and the reaction product was dumped into a large quantity of water with stirring to obtain a powdery resorcinol-blocked triphenylmethane-4,4',4''-triisocyanate. The yield was 86.7%. This will be abbreviated for brevity's sake to TMR$_3$U.

*Example 3*

300 grams of a 20% methylene chloride solution of triphenylmethane-4,4',4''-triisocyanate, 39.6 grams of resorcinol, 16.9 grams of phenol and as the catalyst 0.6 gram of triethylamine were reacted; except that instead of the 200 grams of dioxane, 200 grams of DMF was used.

The product obtained was that consisting of 1 mole of triphenylmethane-4,4',4''-triisocyanate to which an average of 2 moles of resorcinol and 1 mole of phenol were attached. The yield of this product was 92.0%. For brevity's sake, this will be abbreviated to TMR$_2$P$_1$U.

*Example 4*

300 grams of a 20% methylene chloride solution of triphenylmethane-4,4',4''-triisocyanate, 19.8 grams of resorcinol, 33.9 grams of phenol and as the catalyst 0.6 gram of triethylamine were reacted; except that, as in Example 3, instead of the 200 grams of dioxane, 200 grams of DMF was used. The product obtained was that consisting of 1 mole of triphenylmethane-4,4',4''-triisocyanate to which an average of 2 moles of phenol and 1 mole of resorcinol were attached. The yield of this product was 94.1%. For brevity's sake, this product will be abbreviated to TMR$_1$P$_2$U.

*Example 5*

After dissolving 26.4 grams of hydroquinone in 150 grams of dioxane, this was charged to a reactor. This was then stirred for 10 hours at 40° C. while adding dropwise from a dropping funnel a solution in 200 grams of dioxane of 17.4 grams of a mixture consisting of 70% tolylene-2,4 diisocyanate and 30% tolylene-2,6 diisocyanate. Upon completion of the reaction, the product was dumped into a large quantity of water whereby was obtained a mixture of 2,4-tolylene bis(4-hydroxyphenylurethane) and 2,6-tolylene bis(4-hydroxyphenylurethane).

*Example 6*

41.0 grams of dried phloroglucinol dissolved in 200 grams of dioxane was charged to a reactor, and then while adding dropwise 100 grams of a 25% dioxane solution of diphenylmethane-4,4' diisocyanate, was stirred 6 hours at 40° C. Upon completion of the reaction, the product was dumped into a large quantity of water whereby was obtained 4,4'-diphenylmethane bis(3,5-dihydroxyphenylurethane). For brevity's sake, this will be referred to as DPGU.

*Example 7*

The following experiment was conducted to examine the relative difficulty or ease of methylolation and, as a consequence thereof, the dispersibility in water, of the diphenylmethane-4,4' diisocyanate blocked wtih resorcinol (DMRU) and that blocked with phenol (trade name, Hylene-MD, a Du Pont product).

Namely, 12 grams of the DMRU obtained in Example 1 was dissolved in 108 grams of DMF, to which was then added 8 grams of formalin (37%) and 0.1 gram of 10% caustic soda aqueous solution. This was then ripened at 20° C., and every succeeding hour thereafter 12.8 grams of it was taken out and mixed with 37.2 grams of water containing 10 mg. of sodium dioctylsulfosuccinate. When this same procedure was also conducted using Hylene-MP and the two were compared, the following results were obtained.

| Ripening Time, hr. | Dispersibility in Water of DMRU | Dispersibility in Water of Hylene-MP |
|---|---|---|
| 0 | Precipitation of DMRU occurs. | Precipitation of Hylene-MP occurs. |
| 1 | do | Do. |
| 2 | do | Do. |
| 3 | Precipitation somewhat less | Do. |
| 4 | Disperses | Do. |
| 5 | do | Do. |

From these results, it can be seen that in the case of that blocked with resorcinol, the methylolation takes place readily and hence its dispersibility becomes good, but in the case of that blocked with phenol, the methylolation does not readily take place and hence its dispersibility is also not good.

*Example 8*

Twelve grams of the DMRU obtained in Example 1 was dissolved in 10.8 grams of DMF, to which was then added 8 grams of formalin (37%) and 0.1 gram of 10% caustic soda aqueous solution.

The foregoing mixture was then ripened for 4 hours at 20° C. By the operation of a methylolated product of DMRU was obtained. Then, to obtain an emulsion of this methylolated product, a DMF solution of this product was poured with stirring into 372 grams of water containing 0.3 gram of sodium dioctylsulfosuccinate. For convenience's sake, the so obtained emulsion will be referred to hereinafter as emulsion A.

Next, a resorcinol-formaldehyde latex adhesive composition (hereinafter to be referred to as RFL) was prepared as follows:

Twenty grams of resorcinol was dissolved in 110 grams of water, to which was then added 93 grams of 37% formalin. Then, by adding 10% caustic soda aqueous solution the pH of the solution was adjusted to 8.5. The solution was then ripened by allowing it to stand for 5 hours in a 20–25° C. room. The pH of the solution which had declined at the completion of the ripening was again brought to 8.5, after which a mixed liquor consisting of 283 grams of a butadiene/vinylpyridine copolymer latex of a concentration of 40%, 48 grams of natural latex of a concentration of 60% and 146 grams of water was added with stirring to obtain the RFL.

Emulsion A and RFL were mixed in various proportions to obtain the treatment liquors.

A tire cord made from polyethylene terephthalate which was prepared by drawing polyethylene terephthalate filaments into 250 deniers, imparting undertwist to 4 end and upper twist to 2 ends followed by imparting both upper and under twists of 51 turns/10 cm. was treated with a Computreater apparatus (manufactured by C. A. Litzler Company) in which it was dipped in the foregoing treatment liquors and heat treated for several minutes at 220° C. Then employing a vulcanizing mold for H-piece test use, the so treated cords were embedded in an unvulcanized natural rubber compound of the following composition and vulcanized by hot pressing for 50 minutes at 135° C. while applying a pressure of 15 kg./cm.$^2$.

Composition of the unvulcanized natural rubber compound.

| | Parts per hundred rubber |
|---|---|
| Natural rubber smoked sheet | 100 |
| Zinc yellow | 20 |
| Accelerator 2-mercaptobenzothiazole | 1 |
| Cumarone resin | 2.5 |
| Stearic acid | 3 |
| Carbon black, high abrasion furnace | 50 |
| Age resister, phenyl alpha-naphthylamine | 1 |
| Pinetal | 1.5 |
| Sulfur | 3 |
| Total | 182.0 |

The evaluation of the resulting adhesive force of the specimens after vulcanization was conducted by means of the H-piece test. The H-piece test, as referred to herein, is a test for measuring the adhesive force of a cord and it is conducted as follows: A cord is embedded in a rubber piece 15 mm. long, 9 mm. wide and 3 mm. thick with adhering portion being 9 mm. The maximum force required for pulling this cord out from the rubber piece in parallel to the cord axis expressed in kilogram is the adhesive force.

The results obtained were as follows:

ADHESIVE FORCE BY H-PIECE TEST, KG.

| Blend Ratio Emulsion A:RFL | Heat Treatment Conditions 220° C. | | |
|---|---|---|---|
| | 1 min. | 2 min. | 3 min. |
| 2:1 | 11.8 | 12.3 | 10.8 |
| 1:1 | 12.1 | 11.2 | 9.3 |
| 1:2 | 9.2 | 10.6 | 7.9 |
| 0:3 | 4.2 | 5.3 | 4.5 |

*Example 9*

Ten grams of the DMRU obtained in Example 1 and 10 grams of resorcinol were dissolved in 16–18 grams of DMF. Separately, 2 grams of paraformaldehyde was dissolved in 10–14 grams of a 10% methanol solution of caustic soda and 18–20 grams of methanol. The foregoing solutions were mixed, and after adding a small quantity of sodium dioctylsulfosuccinate the mixture was ripened at room temperature. The solution, which at first was yellow, turned to green in 5–15 minutes and then to a light brown color 30 minutes to an hour later. When the ripening has not progressed to any appreciable extent, an addition of water to the mixed solution would cause flakelike precipitation to occur. But when the ripening progresses somewhat more, a milky emulsion results and as the ripening progresses to its fully accomplished stage, the solution freely blends with water so that a homogenous, clear solution results.

The ripening speed is controlled by the concentration of the caustic soda, it being such that if only 10 grams of a 10% methanol solution of caustic soda is added, the rate at which the ripening progresses would become about one half. Further, if the total of the solid is reduced, this also results in a marked reduction of the speed. For instance, if the ripening is carried out with a 20% reduction in the solid content, the time required for obtaining a solution of the same state would be about 10 times. In any event, the ripening is completed in from 3 days to 3 weeks. The ripened mixed solution will hereinafter be referred to as solution B. Next, the treatment liquor will be prepared as follows:

RECIPE FOR TREATMENT LIQUOR C

| | Quantity Charged, parts | Percentage |
|---|---|---|
| 1. Solution B (after ripening for one week) | 100 | 14.9 |
| 2. Butadiene/vinylpyridine copolymer latex (40% concentration) | 150 | 22.4 |
| 3. Water | 420 | 62.7 |
| Total | 670 | 100 |

RECIPE FOR TREATMENT LIQUOR D

| | Quantity Charged, parts | Percentage |
|---|---|---|
| 1. Solution B (after ripening for one week) | 100 | 12.2 |
| 2. Butadiene/vinylpyridine copolymer latex (40% concentration) | 300 | 36.6 |
| 3. Water | 420 | 51.1 |
| Total | 820 | 100 |

The solid content of adhesive ingredients contained in treatment liquors C and D are as follows:

| | Treatment Liquor C, Percent | Treatment Liquor D, Percent |
|---|---|---|
| DMRU: Resorcinol | } 4.5 | 3.7 |
| Paraformaldehyde | | |
| Polybutadiene/vinylpyridine | 8.6 | 14.6 |
| Total Solid | 13.1 | 18.3 |

In accordance with the procedures described in Example 8, tire cords made from polyethylene terephthalate were treated by dipping in treatment liquors C and D, heat treated for several minutes at 200° C. and thereafter bonded and vulcanized to unvulcanized natural rubber. The results obtained by means of the H-piece test are shown below. By way of comparison, the values of the cords, treated with treatment liquor E (RFL liquor) prepared as in the case of liquors C and D of the present example except that DMRU was not contained are also shown.

COMPOSITION OF TREATMENT LIQUOR E

| Ingredients: | Solids, Percent |
|---|---|
| Resorcinol | } 5 |
| Paraformaldehyde | |
| Polybutadiene/vinylpyridine | 15 |
| Water | 80 |

The mole ratio of resorcinol/paraformaldehyde was 1/6.

ADHESIVE FORCE BY H-PIECE TEST, KG.

| Heat Treatment Conditions, 220° C. | Treatment Liquor | | |
|---|---|---|---|
| | C | D | E |
| 1 min | 6.8 | 8.6 | 2.9 |
| 2 min | 10.5 | 9.7 | 3.6 |
| 3 min | 12.8 | 12.5 | 4.8 |
| 4 min | 13.0 | 13.1 | 4.5 |
| 5 min | 11.0 | 12.6 | 3.8 |

*Example 10*

68 grams of the $TMR_3U$, $TMR_2P_1U$ and $TMR_1P_2U$ obtained in Examples 2, 3 and 4 were each dissolved in 200 grams of DMF, to each of which solutions was added 150 grams of methanol alkalized with caustic soda and having 20% paraformaldehyde dissolved therein. When 1 part of these solutions was taken and added to water in a test tube, gelation took place immediately to separate out a white lumpy substance. If these solutions were ripened at room temperature or at 50–60° C., no longer would these lumpy substances form even though the solutions were added to water, but instead milky white emulsions would form. When the ripening progressed still further, a reddish brown, semitransparent solution formed.

As to this solubilization speed, $TMR_3U$ was the fastest followed by $TMR_2P_1U$ and $TMR_1P_2U$, in the order given. By way of comparison, when triphenylmethane-4,4′4″-triisocyanate in which phenol was used in all cases as the blocking agent instead of resorcinol was tested by the same procedures, it was found that the solubilization would not proceed no matter under what conditions the methylolation reaction is carried out.

The DMF solutions of $TMR_3U$, $TMR_2P_1U$ and $TMR_1P_2U$, the methylolation reaction of which had progress in this manner to a solubilizable state, were dumped into water of threefold quantity and then mixed in a 1/1 ratio with the RFL obtained in Example 8 to obtain the treatment liquors. Then, in accordance with the procedures described in Example 8, a tire cord made from polyethylene terephthalate was treated by being dipped in said treatment liquors, heat treated and thereafter bonded and vulcanized to unvulcanized natural rubber. The results obtained by the H-piece test were as follows:

ADHESIVE FORCE BY H-PIECE TEST, KG.

| Principal Ingredient of Treatment Liquor | Heat Treatment Conditions | |
|---|---|---|
| | 220° C., 1 min. | 220° C., 2 min. |
| $TMR_3U$ | 11.3 | 11.8 |
| $TMR_2P_1U$ | 12.0 | 12.5 |
| $TMR_1P_2U$ | 10.3 | 11.6 |

*Example 11*

Ten grams of the DPGU obtained in Example 6 and 20 grams of resorcinol were dissolved in 22 grams of DMF, to which were then added 16 grams of a 10% methanolic solution of caustic soda and a solution of 4 grams of paraformaldehyde in 14 grams of methanol, after which this mixture was ripened at room temperature.

After ripening for 1 week this mixture became capable of freely blending with water. This will be referred to as solution F.

Next, solution G was prepared in accordance with the following recipe:

| | Quantity Charged, parts | Percentage |
|---|---|---|
| Solution F | 100 | 13.9 |
| Butadiene vinylpyridene latex (40% concentration) | 200 | 27.8 |
| Water | 420 | 58.3 |
| Total | 720 | 100 |

The solid content of the adhesive ingredients contained in the treatment liquor G is as follows:

| Effective Ingredient | Solid portion, percent |
|---|---|
| DPGU | } 3.5 |
| Resorcinol | |
| Paraformaldehyde | |
| Polybutadiene/vinylpyridine | 7.0 |
| Total | 10.5 |

When, in accordance with the procedures described in Example 8, a polyethylene terephthalate tire cord was treated by dipping in treatment liquor G, heat treated for 4 to 5 minutes at 180° C. and thereafter bonded and vulcanized to unvulcanized natural rubber, an adhesive force of 10.8 kg. by means of the H-piece test was obtained.

What is claimed is:

1. A process for bonding a shaped structure composed of a linear terephthalate polyester to a rubber compound selected from the group consisting of polymers of isoprene, polymers of butadiene and polymers of chloroprene, which comprises treating said material with an aqueous adhesive composition containing a methylolated blocked organic polyisocyanate and a vulcanizable organic polymer, said methylolated blocked organic polyisocyanate being prepared by blocking an organic polyisocyanate with a polyphenol selected from the group consisting of resorcinol, pyrocatechol, hydroquinone, pyrogallol, hydroxyhydroquinone and phloroglucinol and subsequently methylolating the resulting blocked polyisocyanate with formaldehyde so that the blocked isocyanates have materially increased water dispersibility, heating said material at a temperature of from 100 to 250° C., and thereafter bonding said material to said rubber compound.

2. A process for bonding a shaped structure composed of a linear terephthalate polyester to a rubber compound selected from the group consisting of polymers of isoprene, polymers of butadiene and polymers of chloroprene, which comprises treating said material with an aqueous adhesive composition containing a methylolated blocked organic polyisocyanate and a vulcanizable organic polymer, said methylolated blocked organic polyisocyanate being prepared by blocking an organic polyisocyanate selected from the group consisting of 2,4-tolylene diisocyanate, 2,6-tolylene diisocyanate, 1,4-phenylene diisocyanate, 1,3-phenylene diisocyanate, 4,4′-diphenylmethane diisocyanate, 4,4′,4″-triphenylmethanetriisocyanate and 1,5-naphthylene diisocyanate with a polyphenol selected from the group consisting of resorcinol, pyrocatechol, hydroquinone, pyrogallol, hydroxyhydroquinone and phloroglucinol and subsequently methylolating the resulting blocked polyisocyanate with formaldehyde so that the blocked isocyanates have materially increased water dispersibility, heating said material at a temperature of from 100° to 250° C., and thereafter bonding said material to said rubber compound.

3. A process for bonding a shaped structure composed of a linear terephthalate polyester to a rubber compound selected from the group consisting of polymers of isoprene, polymers of butadiene and polymers of chloroprene, which comprises treating said material with an aqueous adhesive composition containing a methylolated blocked organic polyisocyanate and a vulcanizable organic polymer, said methylolated blocked organic polyisocyanate being prepared by blocking an organic polyisocyanate selected from the group consisting of 2,4-tolylene diisocyanate, 2,6-tolylene diisocyanate, 1,4-phenylene diisocyanate, 1,3-phenylene diisocyanate, 4,4′-diphenylmethanediisocyanate, 4,4′,4″ - triphenylmethanetriisocyanate and 1,5-naphthylene diisocyanate with a polyphenol selected from the group consisting of resorcinol, pyrocatechol, hydroquinone, pyrogallol, hydroxyhydroquinone and phloroglucinol and subsequently methylolating the resulting blocked polyisocyanate with formaldehyde so that the blocked isocyanates have materially increased water dispersibility, said vulcanizable organic polymer being selected from the group consisting of natural rubber, a butadiene/styrene copolymer, a butadiene/vinylpyridine copolymer, a butadiene/acrylonitrile copolymer, a butadiene/styrene/vinylpyridine copolymer, a polychloroprene and an isobutylene/isoprene copolymer, heating said material at a temperature of from 100 to 250° C., and thereafter bonding said material to said rubber compound.

4. A process in accordance with claim 1 wherein the aqueous adhesive composition contains from 1 to 20% by weight of the methylolated blocked organic polyisocyanate and from 1 to 20% by weight of the vulcanizable organic polymer.

5. A process in accordance with claim 2 wherein the aqueous adhesive composition contains from 1 to 20% by weight of the methylolated blocked organic polyisocyanate and from 1 to 20% by weight of the vulcanizable organic polymer.

6. A process in accordance with claim 3 wherein the aqueous adhesive composition contains from 1 to 20% by weight of the methylolated blocked organic polyisocyanate and from 1 to 20% by weight of the vulcanizable organic polymer.

7. A process in accordance with claim 1 wherein the aqueous adhesive composition contains from 1 to 20% by weight of the methylolated blocked organic polyisocyanate, from 1 to 20% by weight of the vulcanizable organic polymer and from 1 to 10% by weight of a water soluble resorcinol/formaldehyde condensate.

8. A process in accordance with claim 2 wherein the aqueous adhesive composition contains from 1 to 20% by weight of the methylolated blocked organic polyisocyanate, from 1 to 20% by weight of the vulcanizable organic polymer and from 1 to 10% by weight of a water-soluble resorcinol/formaldehyde condensate.

9. A process in accordance with claim 3 wherein the aqueous adhesive composition contains from 1 to 20% by weight of the methylolated blocked organic polyisocyanate, from 1 to 20% by weight of the vulcanizable organic polymer and from 1 to 10% by weight of a water soluble resorcinol/formaldehyde condensate.

10. An adhesive composition comprising an aqueous dispersion containing from 1 to 20% by weight of a methylolated blocked organic polyisocyanate and from 1 to 20% by weight of a vulcanizable organic polymer, said methylolated blocked organic polyisocyanate being prepared by blocking an organic polyisocyanate selected from the group consisting of 2,4-tolylene diisocyanate, 2,6-tolylene diisocyanate, 1,4-phenylene diisocyanate, 1,3-phenylene diisocyanate, 4,4′ - diphenylmethanediisocyanate, 4,4′,4″-triphenylmethanetriisocyanate and 1,5-naphthylene diisocyanates with a polyphenol selected from the group consisting of resorcinol, pyrocatechol, hydroquinone, pyrogallol, hydroxyhydroquinone, pyrogallol, hydroxyhydroquinone and phloroglucinol and subsequently methlylolating the resulting blocked polyisocyanate with formaldehyde so that the blocked isocyanates have materially increased water dispersibility and said vulcanizable organic polymer being selected from the group consisting of natural rubber, a butadiene/styrene copolymer, a butadiene/vinylpyridine copolymer, a butadiene/acrylonitrile copolymer, a butadiene/styrene/vinylpyridine copolymer, a polychloroprene and an isobutylene/isoprene copolymer.

11. An adhesive composition comprising an aqueous dispersion containing from 1 to 20% by weight of a methylolated blocked organic polyisocyanate, from 1 to 20% by weight of a vulcanizable organic polymer and from 1 to 10% by weight of a water-soluble resorcinol/formaldehyde condensate, said methylolated blocked organic polyisocyanate being prepared by blocking an organic polyisocyanate selected from the group consisting of 2,4-tolylene diisocyanate, 2,6-tolylene diisocyanate, 1,4-phenylene diisocyanate, 1,3-phenylene diisocyanate, 4,4′-diphenylmethanediisocyanate, 4,4′,4″ - triphenylmethanetriisocyanate and 1,5-napthylene diisocyanate with a polyphenol selected from the group consisting of resorcinol, pyrocatechol, hydroquinone, pyrogallol, hydroxyhydroquinone and phloroglucinol and subsequently methylolating the resulting blocked polyisocyanate with formaldehyde so that the blocked isocyanates have materially increased water dispersibility, and said vulcanizable organic polymer being selected from the group consisting of natural rubber, a butadiene/styrene copolymer, a butadiene/vinylpyridine copolymer, a butadiene/acrylonitrile copolymer, a butadiene/styrene/vinylpyridine copolymer, a polychloroprene and an isobutylene/isoprene copolymer.

12. An adhesive composition comprising an aqueous dispersion containing from 2 to 10% by weight of a methylolated blocked organic polyisocyanate and from 5 to 15% by weight of a vulcanizable organic polymer and from 2 to 8% by weight of a water-soluble resorcinol/formaldehyde condensate, said methylolated blocked organic polyisocyanate being prepared by blocking an organic polyisocyanate selected from the group consisting of 2,4-tolylene diisocyanate, 2,6-tolyene diisocyanate, 1,4-phenylene diisocyanate, 1,3-phenylene diisocyanate, 4,4′-diphenylmethane diisocyanate, 4,4′,4″-triphenylmethanetriisocyanate and 1,5-naphthylene diisocyanate with resorcinol and subsequently methylolating the resulting blocked polyisocyanate with formaldehyde so that the blocked isocyanates have materially increased water dispersibility, and said vulcanizable organic polymer being selected from the group consisting of natural rubber, a butadiene/styrene copolymer, a butadiene/vinylpyridine copolymer, a butadiene/acrylonitrile copolymer, a butadiene/styrene/vinylpyridine copolymer, a polychloroprene and an isobutylene/isoprene copolymer.

References Cited

UNITED STATES PATENTS

| | | | |
|---|---|---|---|
| 2,766,164 | 10/1956 | Salem | 161—190 |
| 2,826,526 | 3/1958 | Meyrick et al. | 161—190 |
| 2,990,313 | 6/1961 | Knowles et al. | 156—110 |
| 2,993,825 | 7/1961 | Gage | 156—110 |
| 2,994,671 | 8/1961 | Thompson | 260—17 |
| 2,994,672 | 8/1961 | Geerdes | 260—17 |
| 3,038,876 | 6/1962 | Farago | 260—45.5 |
| 3,051,212 | 8/1962 | Daniels | 152—330 |
| 3,060,078 | 10/1962 | Atwell | 156—335 |

OTHER REFERENCES

Thompson et al. in Adhesives Age, vol. II, page 30, February 1959.

EARL M. BERGERT, *Primary Examiner.*

CLIFTON B. COSBY, *Examiner.*